United States Patent
Reimers et al.

(10) Patent No.: US 7,601,788 B2
(45) Date of Patent: Oct. 13, 2009

(54) BRANCHED IONOMERS

(75) Inventors: Jay Reimers, Houston, TX (US); Jose M. Sosa, Deer Park, TX (US)

(73) Assignee: Fina Technology, Inc., Houston, TX (US)

( * ) Notice: Subject to any disclaimer, the term of this patent is extended or adjusted under 35 U.S.C. 154(b) by 106 days.

(21) Appl. No.: 11/932,053

(22) Filed: Oct. 31, 2007

(65) Prior Publication Data

US 2008/0051540 A1    Feb. 28, 2008

Related U.S. Application Data

(60) Continuation of application No. 11/638,200, filed on Dec. 13, 2006, now Pat. No. 7,309,749, which is a division of application No. 11/043,595, filed on Jan. 26, 2005, now Pat. No. 7,179,873.

(51) Int. Cl.
*C08F 30/04* (2006.01)
*C08F 20/00* (2006.01)
*C08I 31/00* (2006.01)

(52) U.S. Cl. ............ 526/240; 526/317.1; 524/560
(58) Field of Classification Search ........... 526/240, 526/317.1; 524/560
See application file for complete search history.

(56) References Cited

U.S. PATENT DOCUMENTS 7,179,873 B2 *   2/2007   Reimers et al. ............ 526/240

* cited by examiner

*Primary Examiner*—Ling-Siu Choi
*Assistant Examiner*—Michael M Bernshteyn
(74) *Attorney, Agent, or Firm*—Tenley R. Krueger (57) ABSTRACT

A branched aromatic ionomer is prepared by co-polymerizing a first monomer having an aromatic moiety and an unsaturated alkyl moiety and a second monomer having an ionic moiety and at least one unsaturated moiety. The ionic moiety may have a cationic group having a valence of +1 or greater. Styrene is among the useful first monomers and sodium methacrylate and zinc dimethacrylate are among the useful second monomers. The branched aromatic ionomers may be used to prepare articles including foamed polystyrene and microwave save dishes and utensils.

37 Claims, 4 Drawing Sheets

BRANCHED IONOMERS

CROSS REFERENCE TO RELATED APPLICATIONS

This application is a continuation application of the divisional application, U.S. patent application Ser. No. 11/638,200, of parent application, U.S. patent application Ser. No. 11/043,595, filed on Jan. 26, 2005, and this application claims priority under 35 U.S.C. 120 to the foregoing parent application . This continuation application was filed while the divisional application was still pending.

BACKGROUND OF THE INVENTION

1. Field of the Invention

The present invention relates to polymers. The present invention particularly relates to ionomer polymers.

2. Background of the Art

In the art of preparing polymers, it may be desirable to impart to or increase the branching of polymer chains. Increased branching may impart physical property changes to the polymer including increased strength, higher temperature performance, and improved hardness. In some instances, increased branching may improve properties such as elastomeric performance and abrasion resistance.

Ionomers are known to be useful in many applications. For example, a polyester ionomer dyeability enhancer may be derived from the reaction residue of an aryl carboxylic acid sulfonate salt, an aromatic dicarboxylic acid, an aliphatic dicarboxylic acid, an aliphatic diol or any of their ester-forming derivatives. A photocurable dental cement may be prepared using a photocurable ionomer, which is defined as a polymer having sufficient pendent ionic groups to undergo a setting reaction in the presence of a reactive filler and water and sufficient pendent polymerizable groups to enable the resulting mixture to be polymerized, e.g., cured upon exposure to radiant energy.

Another ionomer application is in the area of preparing abrasive surfaces. Ionomers useful in this application are copolymers of ethylene with unsaturated acid salts such as the zinc salt of acrylic acid. Typical commercial products of this type include Aclyn®, Himiran™, Coathylene®, Surlyn® and Escor® polymers. Surlyn®, of course, is a well known component in the covers of some premium golf balls.

SUMMARY OF THE INVENTION

In one aspect, the present invention is a branched aromatic ionomer prepared by co-polymerizing a first monomer having an aromatic moiety and an unsaturated alkyl moiety and a second monomer having an ionic moiety and at least two unsaturated moieties. In this aspect, the ionic moiety has at least two ionizable groups, a cationic group that ionizes to form cations and an anionic group that ionizes to form anions and the cationic group is poly-valent and one capable of forming bridges to other molecules in the presence of ions of a suitable type and concentration.

In another aspect, the present invention is a branched aromatic ionomer prepared by co-polymerizing a first monomer having an aromatic moiety and an unsaturated alkyl moiety and a second monomer having an ionic moiety and at least one unsaturated moiety. In this aspect, the ionic moiety has at least two ionizable groups, a cationic group that ionizes to form cations and an anionic group that ionizes to form anions and the cationic group is a mono-valent group.

Another aspect of the present invention is a process for preparing a branched aromatic ionomers. The process includes copolymerizing a first monomer having an aromatic moiety and an unsaturated alkyl moiety and a second monomer having an ionic moiety and at least one unsaturated moiety.

In still another aspect, the present invention is an article of manufacture. The article is formed from a branched aromatic ionomer prepared by co-polymerizing a first monomer having an aromatic moiety and an unsaturated alkyl moiety and a second monomer having an ionic moiety and at least two unsaturated moieties. In this aspect, the ionic moiety has at least two ionizable groups, a cationic group that ionizes to form cations and an anionic group that ionizes to form anions and the cationic group is poly-valent and one capable of forming bridges to other molecules in the presence of ions of a suitable type and concentration.

Another aspect of the present invention is an article of manufacture. The article is formed from a branched aromatic ionomer prepared by co-polymerizing a first monomer having an aromatic moiety and an unsaturated alkyl moiety and a second monomer having an ionic moiety and at least one unsaturated moiety. In this aspect, the ionic moiety has at least two ionizable groups, a cationic group that ionizes to form cations and an anionic group that ionizes to form anions and the cationic group is a mono-valent group.

BRIEF DESCRIPTION OF THE DRAWINGS

For a detailed understanding and better appreciation of the present invention, reference should be made to the following detailed description of the invention and the preferred embodiments, taken in conjunction with the accompanying drawings, wherein.

DETAILED DESCRIPTION OF INVENTION

The term "ionomer" is defined in the art of preparing polymers as a polymer with covalent bonds between elements of the polymer chain and ionic bonds between the separate chains of the polymer ionomer is also defined as polymers containing inter-chain ionic bonding. Thermoplastic ionomers have the unique property of forming reversible crosslinks. At melt processing temperatures, crosslinks dissociate to later reform as the material cools to its glass transition temperature.

Branched aromatic ionomers may be formed by co-polymerizing a first monomer having an aromatic moiety and an unsaturated alkyl moiety and a second monomer having an ionic moiety and at least one unsaturated moiety. For example, suitable first monomers having an aromatic moiety and an unsaturated alkyl moiety may include monovinylaromatic compounds such as styrene as well as alkylated styrenes wherein the alkylated styrenes are alkylated in the nucleus or side-chain. Alphamethyl styrene, t-butylstyene, p-methylstyrene, and vinyl toluene are suitable first monomers that may be useful for preparing branched aromatic ionomers. The monovinylaromatic compounds may be employed singly or as mixtures. In one embodiment, styrene is used exclusively as the first monomer. Any monomer having an aromatic moiety and an unsaturated alkyl moiety may be used to prepare the branched aromatic ionomers.

The second monomer has an ionic moiety and at least one unsaturated moiety. The ionic moiety has at least two ionizable groups, one group that ionizes to form cations and one that ionizes to form anions. In one embodiment, the group that ionizes to form cations, hereinafter "cationic group," is a mono-valent group. In another embodiment, the cationic group is poly-valent and one capable of forming bridges to other molecules in the presence of ions of a suitable type and concentration.

When the cationic group in the second monomer is a mono-valent group, it is a mono-valent metal or a quaternary ammonium ion forming compound. Suitable metals include sodium, potassium, cesium, silver, and the like. Suitable quaternary ammonium compounds include ammonium chloride, methyl ammonium chloride, diethyl ammonium chloride, and the like.

When the cationic group is one capable of forming bridges to other molecules in the presence of ions of a suitable type and concentration, it is a group that ionizes to form cations having a valence of +2 or higher. In one embodiment, the cationic group may be a metal having an oxidation state of +2 or higher. Suitable metals include zinc, copper, lead, calcium, magnesium, zirconium, aluminum, and the like.

The second ionizable group is an organic group that ionizes to form an anion having a coordination charge of −1 or lower. Suitable groups include the anions of amines, carboxylic acids, sulfonic acids, phosphonic acids, thioglycolic acids and the like. When the cationic group has a valence of greater than +1, the first and second ionizable groups may form a bridge.

The anionic group includes at least one polymerizable unsaturated moiety. In some embodiments, there is only one. In other embodiments, there may be two or more such moieties. The unsaturated moiety may be a terminal or non-terminal carbon-carbon double bond.

Exemplary compounds useful as the second monomer may be prepared with a metal cation and an organic anion having at least one unsaturation. Suitable compounds that may be used as the second monomer include any having a general formula:

wherein R is a hydrocarbon chain having from 2 to 40 carbons and at least one polymerizable unsaturation; A is an anionic group; M is a cationic group; Z is −1 or −2; X is +1, +2, +3, +4, or +5; and y is an integer having a value of from 1 to 4.

When y is 1, R may have one or more polymerizable unsaturations. In embodiments where y is 1, R may have two or more unsaturations and the unsaturations will either be on separate chains or else sufficiently far apart on a single chain to allow for polymerization without substantial steric hindrance. In some embodiments, (y*Z)+X=0, that is, only anionic groups having a polymerizable unsaturation will be coordinated to the M group, however it is within the scope of the claims that additional groups not having a polymerizable unsaturation may be coordinated to the M group. When this occurs, there may still be at least two polymerizable unsaturations coordinated to the M group in addition to any other coordinated groups.

Compounds that may be used as the second monomer of the present invention include, but are not limited to: zinc alkoxide, zinc butoxide, zinc diacrylate, zinc dimethacrylate, zinc di-vinylacetate, zinc di-ethylfumarate, and the like; calcium carbonate; copper diacrylate, copper dimethacrylate, copper di-vinylacetate, copper di-ethylfumarate, and the like; aluminum triacrylate, aluminum trimethacrylate, aluminum tri-vinylacetate, aluminum tri-ethylfumarate, aluminum (III) isopropoxide, and the like; zirconium tetraacrylate, zirconium tetramethacrylate, zirconium tetra-vinylacetate, zirconium tetra-ethylfumarate, zirconium (IV) butoxide and the like. For compounds having monovalent cationic groups, the second monomer may be sodium acrylate, sodium methacrylate, sodium ethoxide, silver methacrylate, and the like. These compounds and any four are not all of the possible interactions of the monomers. In addition, most of the properties of the ionomers associated with its primary, secondary, and even tertiary structure, such as the ionomers' glass transition temperatures "Tg" may be affected.

Both the amount of second monomer and the type of interaction with the first monomer will dictate the amount of second monomer used. Therefore, in some embodiments where the interaction is weak, such as when the cationic group of the second monomer is mono-valent, and a significant amount of effect is desired from the second monomer, the branched ionomers are prepared with a comparatively large amount of the first monomer, typically with a ratio of first monomer to second monomer of from about 999:1 to about 40:60. In other such embodiments, the ratio is from about 95:5 to about 50:50. In still other such embodiments, the ratio is from about 90:10 to about 60:40. Other embodiments have a ratio of from 80:20 to 70:30. Where the interaction is very strong, such as when the cationic group is di- or tri-valent, or only small changes to the properties of the ionomer due to the second monomer are desired, the amount of the second monomer is quite small ranging from about 10 parts per million "ppm" to about 10,000 ppm. In other such ionomers, the range is from about 100 ppm to about 1000 ppm. In still other such ionomers, the range is from about 250 ppm to about 800 ppm.

The branched aromatic ionomer is prepared by co-polymerizing the first and second monomers Each of these monomers has at least one polymerizable unsaturation. The polymerization may be carried out using any method known to those of ordinary skill in the art of performing such polymerizations. For example, the polymerization may be carried out by using a polymerization initiator.

Examples of the polymerization initiators are, for instance, radical polymerization initiators such as benzoyl peroxide, lauroyl peroxide, t-butyl peroxybenzoate and 1,1-di-t-butylperoxy-2,4-di-t-butylcyclohexane. The amount compound useful as the second monomer may be prepared by, for example, reacting an organic acid or an anhydride with a metal or metal salt. When the cation group is polyvalent, then the organic acid and the polyvalent metal may be reacted under conditions sufficient to prepare a bridge between the anionic group and the cationic group. Compounds useful as the second monomer may be prepared by any method known to those of ordinary skill in the art of preparing monomers to be useful.

The monomers used to prepare the branched aromatic ionomers may interact in several ways to affect the physical properties of the ionomers. A first way is the formation of covalent bonds due to the polymerization of the unsaturated moieties.

A second way that the monomers used to prepare the branched aromatic ionomers may interact is by the formation of a bridge wherein a polyvalent cationic group is coordinated to two anionic groups which are integrated into the backbones of at least two separate chains. This coordination may, in effect, cross link the two chains thereby increasing that segment's total effective molecular weight to the sum of the two chains.

A third way that that the monomers used to prepare the branched aromatic ionomers may interact is by the formation of multiple bridges as described immediately above. The more crosslinking that occurs, the less flexible the three dimensional structure of the ionomer, which may result in lower melt flow values and increased melt strength.

In yet a fourth way of interacting, when the cationic groups are mono-valent, the ionic moieties, while not fully bridged, may still associate due to hydrophobic-hydrophilic forces. In these embodiments, this weaker but still measurable force may result from the comparatively non-polar hydrophobic, non-ionic parts of the molecule being mutually attracted and repelled from the polar hydrophilic ionic parts of the ionomer. These forces are more noticeable as the proportion of the second monomer is increased in concentration. These of the polymerization initiator is from about 0 to about 1 percent by weight of the monomers. In one embodiment, the amount of polymerization initiator is from about 0.01 to about 0.5 percent by weight of the monomers. In another embodiment, the amount of polymerization initiator is from about 0.025 to about 0.05 percent by weight of the monomers.

Alternatively, rather than using an initiator, the ionomer may be prepared using heat as an initiator. The ionomer may be prepared using a non-conventional initiator such as a metallocene catalyst as is disclosed in U.S. Pat. No. 6,706,827 to Lyu, et al., which is incorporated herein in its entirety by reference. In one embodiment, the monomers may be admixed with a solvent and then polymerized. In another embodiment, one of the monomers is dissolved in the other and then polymerized. In still another embodiment, the monomers may be fed concurrently and separately to a reactor, either neat or dissolved in a solvent, such as mineral oil. In yet another embodiment, the second monomer may be prepared in-situ or immediately prior to the polymerization by admixing the raw material components, such as an unsaturated acid or anhydride and a metal alkoxide, in-line or in the reactor. Any process for polymerizing monomers having polymerizable unsaturation know to be useful to those of ordinary skill in the art in preparing such polymers may be used. For example, the process disclosed in U.S. Pat. No. 5,540,813 to Sosa, et al., may be used and is incorporated herein in its entirety by reference. The processes disclosed in U.S. Pat. No. 3,660,535 to Finch, et al., and U.S. Pat. No. 3,658,946 to Bronstert, et al., may be used and are both incorporated herein in their entirety. Any process for preparing general purpose polystyrene may be used to prepare the branched aromatic ionomer ionomers.

In certain embodiments, the ionomers may be admixed with additives prior to being used in end use applications. For example, the ionomers may be admixed with fire retardants, antioxidants, lubricants, blowing agents, UV stabilizers, antistatic agents, and the like. Any additive known to be useful to those of ordinary skill in the art of preparing ionomers to be useful may be used with the branched ionomers.

The ionomers are useful as general purpose polystyrene, but may also be used in other applications. They may be foamed to prepare foamed polystyrene. The ionomers may be used in applications where high temperature performance is desirable such as microwave safe dishes and utensils. The ionomers may be used to form other objects such as containers and as components in automobiles, toys, and the like. The polar ionic moieties of the ionomers may enhance their compatibility with polyesters such as polyethylene terephthalate and polycarbonate, so the branched ionomers may be used in blends and alloys with these and other similarly polar polymers.

EXAMPLES

The following examples are provided to illustrate the present invention. The examples are not intended to limit the scope of the present invention and they should not be so interpreted. Amounts are in weight parts or weight percentages unless otherwise indicated.

Example 1

Polystyrene homopolymer is prepared using a stirred 500 ml reaction kettle. The polymerization is initiated using a LUPERSOL® 233 catalyst at a concentration of about 170 ppm. The reaction is run at about 267° F. (131° C.). The initial melt flow of the polystyrene is 3.7 dg/minute. The second monomer Zinc dimethacrylate "ZnMA" is added in stages by first dissolving the ZnMA in styrene, the first monomer, and then feeding the solution to the reactor. The reactor was allowed to stabilize and samples 1-A, 1-B, and 1-C were collected at points where the concentration of ZnMA in styrene is 400 ppm, 600 ppm and 800 ppm. The samples are tested and the results shown below in Table 1.

Example 2

Example 1 is repeated substantially identically except that the reaction is run at 275° F. (135° C.), and 175 ppm of LUPERSOL® 233 catalyst, and the components shown in Table 2 are used. The n-dodecyl mercaptan (NDM), serves as a chain transfer agent. Samples 2-A, 2-B, 2-C, 2-D, and 2E were tested and the results shown below in Table 2.

Example 3

Four samples of Polystyrene were prepared using a constant concentration of methacrylic acid using the same procedure and apparatus as in Example 2 except that the acid is neutralized in the feed with one of the second monomers that have different valences: sodium ethoxide, calcium carbonate, aluminum (III) isopropoxide, and zirconium (IV) butoxide, and the LUPERSOL® 233 catalyst is used at a concentration of 200 ppm. Samples 3-A, 3-B, 3-C, and 3-D were tested and the results shown below in Table 3.

TABLE 1

|  | Example 1-A | Example 1-B | Example 1-C |
|---|---|---|---|
| [ZnMA] ppm | 400 | 600 | 800 |
| MFI[1] | NA | 3.84 | 3.51 |

TABLE 1-continued

|  | Example 1-A | Example 1-B | Example 1-C |
|---|---|---|---|
| Flex Strength[2] | NA | 13,808/95.2 | 13,377/92.2 |
| Tensile Strength Yld[3] | NA | 7,421/51.2 | 7,409/51.1 |
| Tensile Strength Brk[3] | NA | 7326/50.5 | 7,290/50.5 |
| Elongation[3] | NA | 3.0 | 2.5 |
| Vicat[4] | NA | 220/104 | 220/104 |
| Mn[5] | 94 | 95 | 94 |
| Mw[5] | 249 | 298 | 315 |
| Mz[5] | 424 | 1978 | 2,433 |
| Polydispersity[6] | 2.6 | 3.2 | 3.3 |

[1] ASTM D-1238 g/10 min, 200 C./5 kg, October 2001.
[2] ASTM D-790 psi/MPa, January 2001
[3] ASTM D-638 psi/MPa, psi, %, September 2001
[4] ASTM D-1525, F/C, May 2000
[5] ASTM D-6474
[6] Mz/Mn

DISCUSSION OF THE FIGURES

Figure 1:
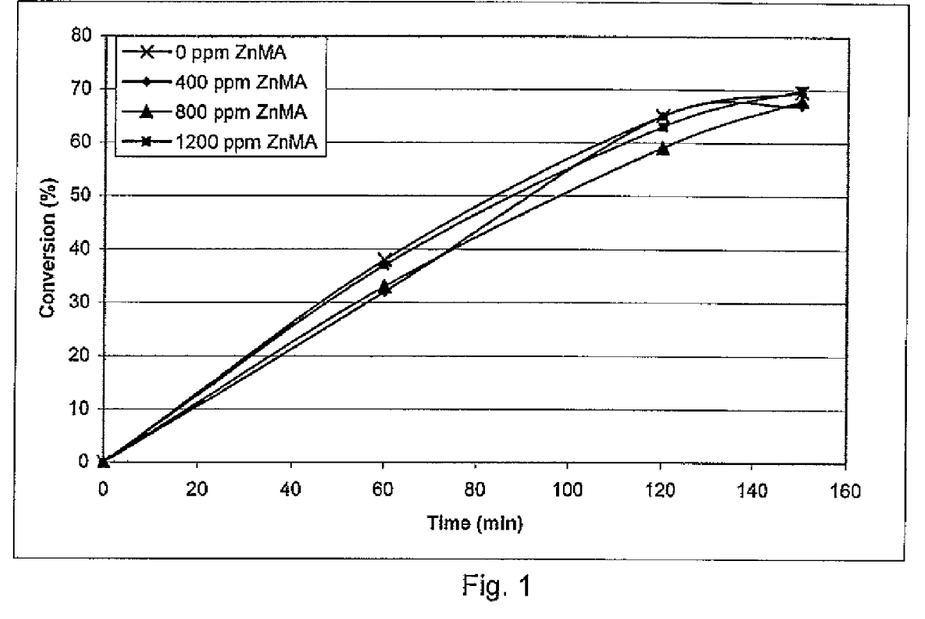
FIG. 1 is graph of Conversion Versus Time during the runs made in Example 2.
Figure 2:
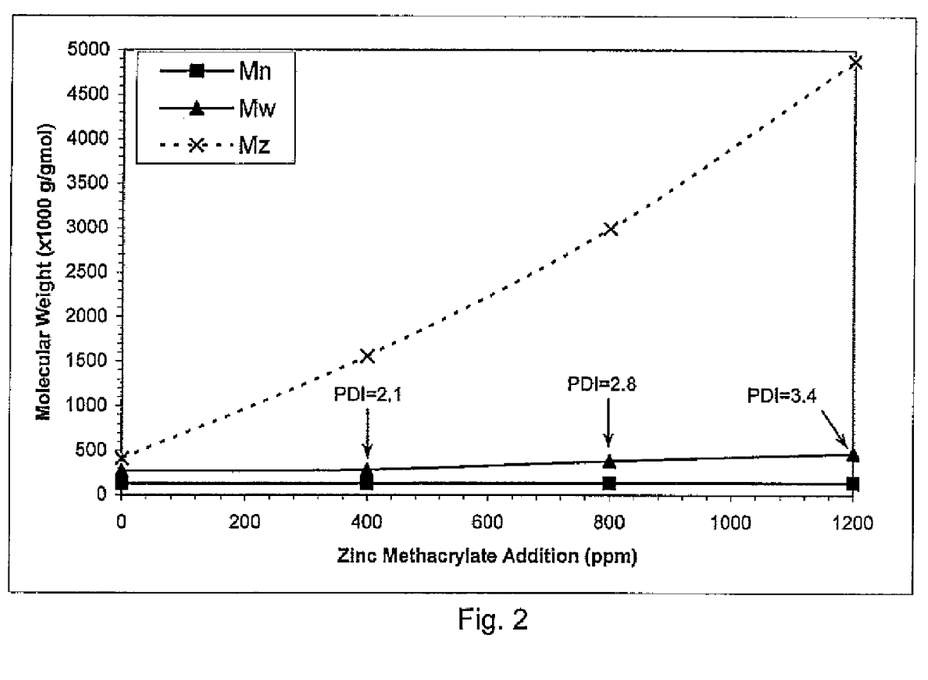
FIG. 2 is a graph of the Molecular Weight Results during the runs made in Example 2.
Figure 3:
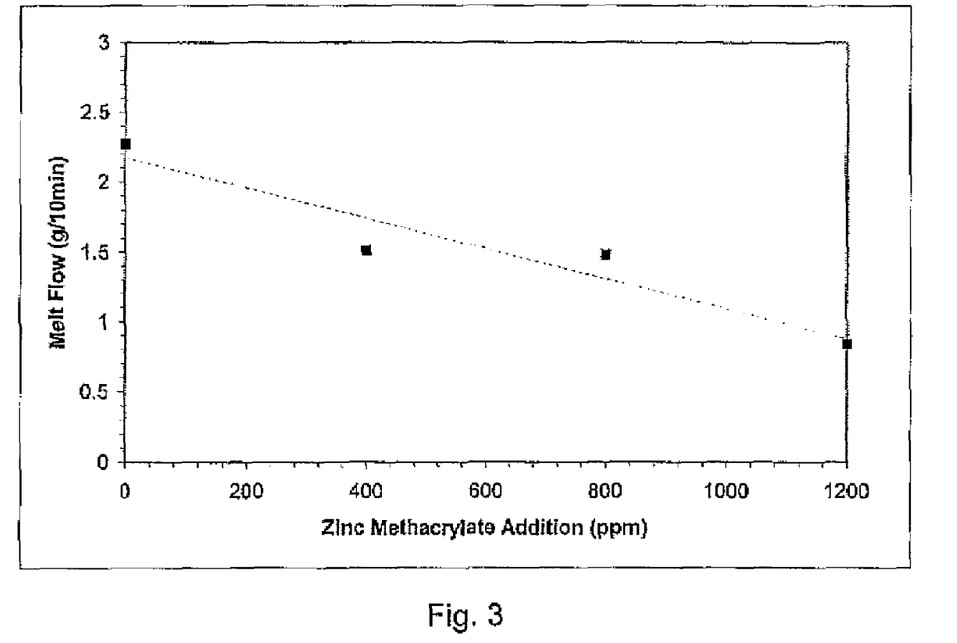
FIG. 3 is a graph of the Melt Flow Results during the runs made in Example 2.
Figure 4:
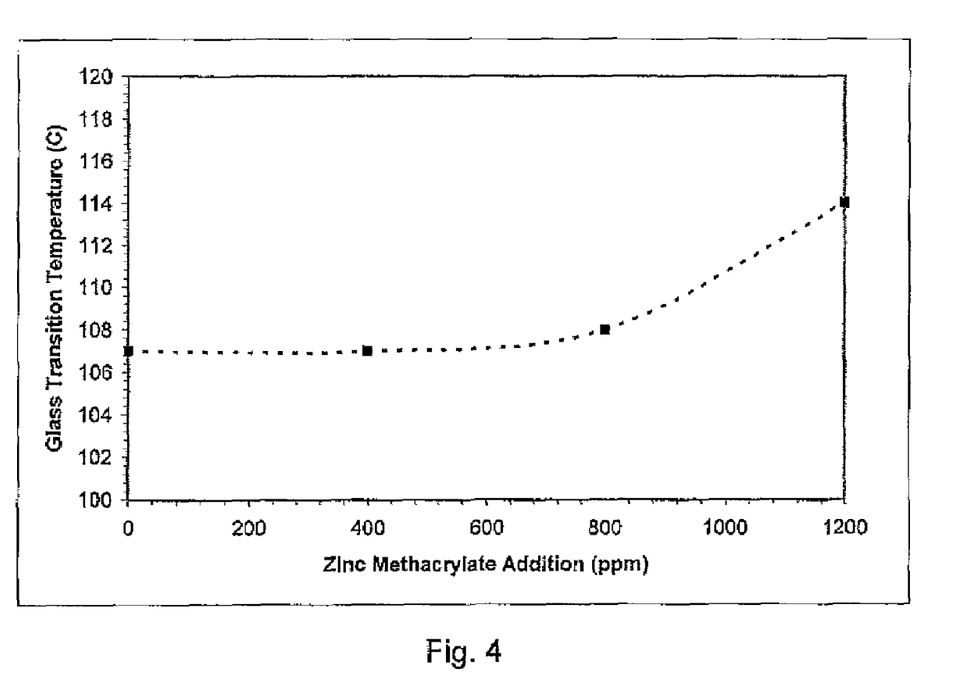
FIG. 4 is a graph of the Glass Transition Temperature Results during the runs made in Example 2.

FIGS. 1-4 are graphical representations of the values recorded relating to Example 2. Therein, zinc di-methacrylate is shown to be an effective di-functional monomer to induce chain-branching and to increase the z-average molecular weight in polystyrene. Levels as low as 200 ppm increased the z-average molecular weight of the polystyrene to close to 1,000,000 g/mol. Despite the efficiency of this monomer as a crosslinking agent, the resulting polymers did not show signs of gelation at levels of addition producing molecular weights of up to 6,000,000 g/mol.

Figure 5:
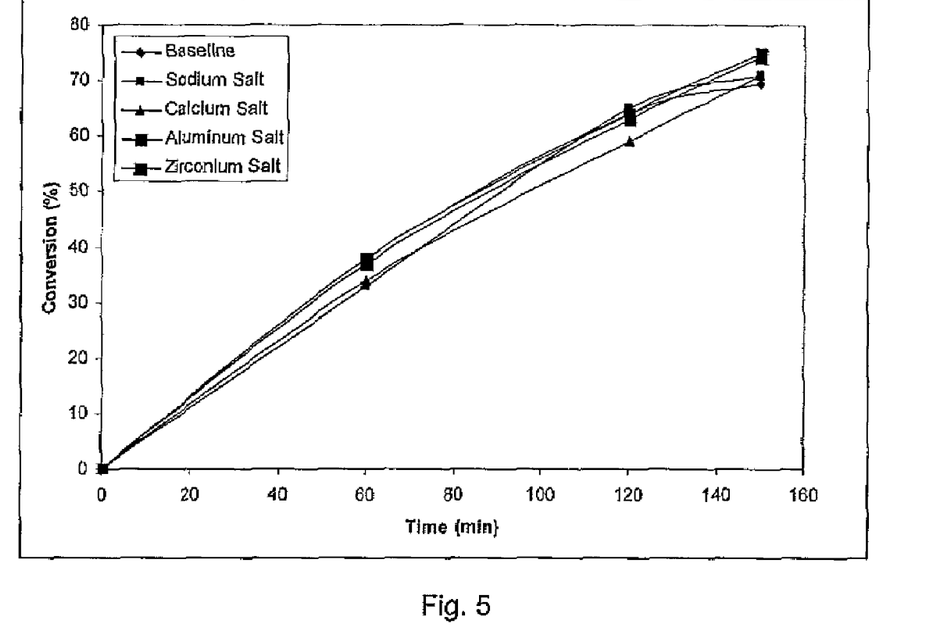
FIG. 5 is a graph of the Conversion Verses Time for the runs made in Example 3.
Figure 6:
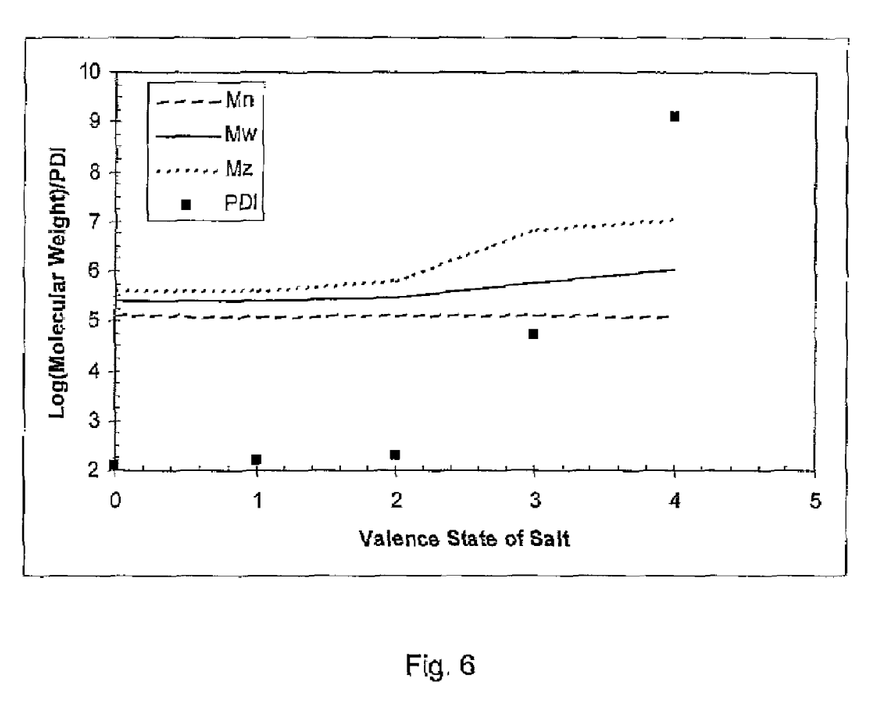
FIG. 6 is a graph of the Molecular Weights Results for the runs made in Example 3.
Figure 7:
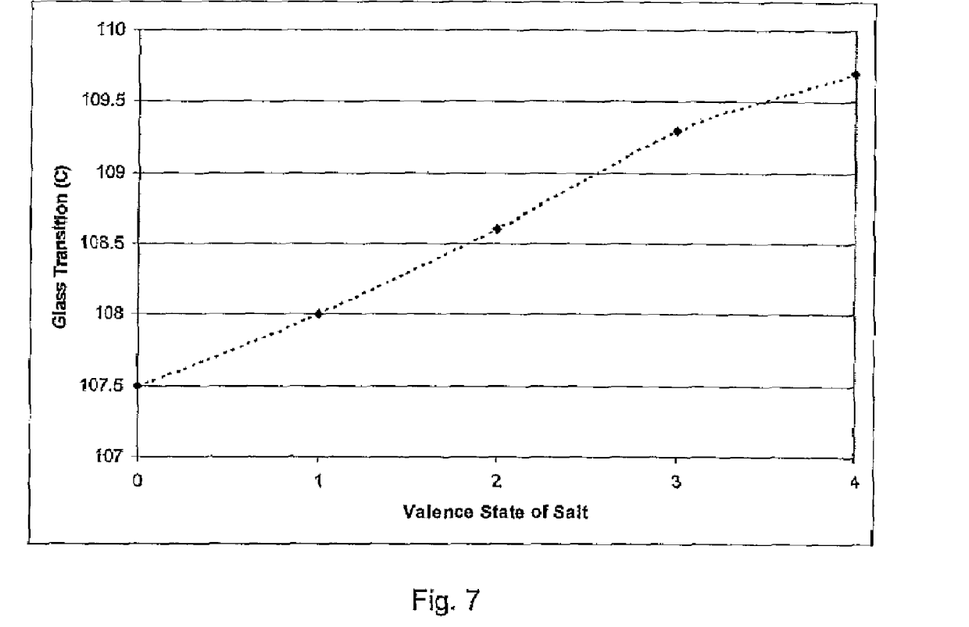
FIG. 7 is a graph of the Glass Transition Temperature Results for the runs made in Example 3.
Figure 8:
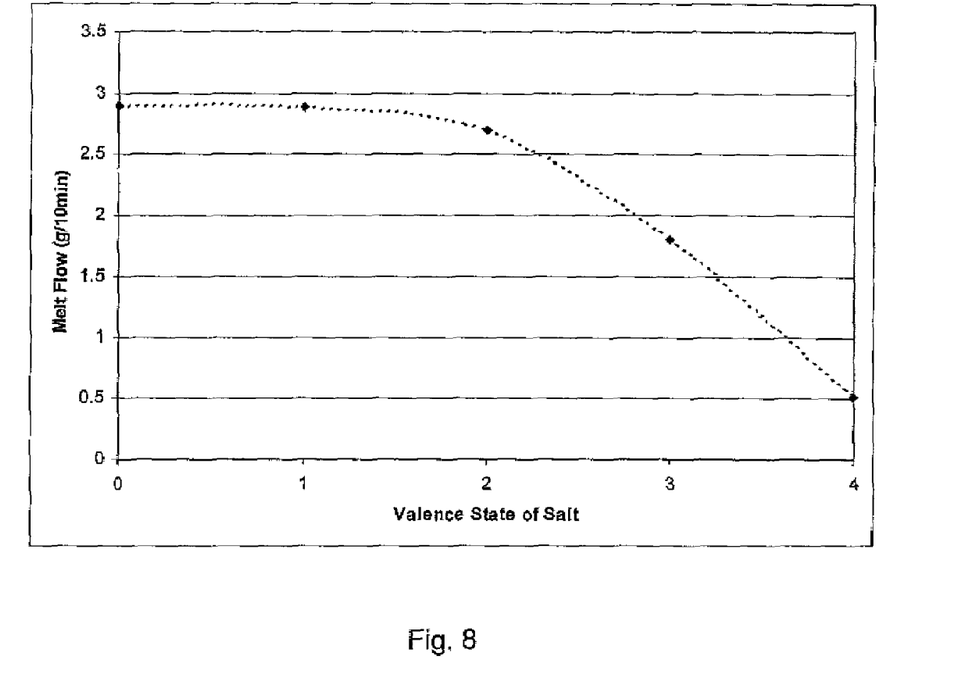
FIG. 8 is a graph of the Melt Flow Results for the runs made in Example 3. It will be appreciated that the figures are not necessarily to scale and the proportions of certain features may be exaggerated to show detail.

FIGS. 4-8 are graphical representations of the values recorded relating to Example 3. They show that various salts of methacrylic acid may be synthesized, in-situ, in the polymer feed, prior to polymerization. They also show that in going from a mono-valent to a tri-, or tetra-valent counter-ion, the weight average molecular weight is observed to double or triple, and the z-average molecular weight is observed to increase up to 20 fold. It is observed that in going to higher valence states, the increase in molecular weight is accompanied by a decrease in the melt flow, however, even for molecular weights of 1,000,000 g/mol, the material still flows.

TABLE 2

|  | Comp-2* | 2-A | 2-B | 2-C | 2-D | 2-E |
|---|---|---|---|---|---|---|
| [ZnMA] ppm | 0 | 1200 | 1200 | 1800 | 4000 | 5000 |
| NDM ppm | 0 | 0 | 100 | 150 | 440 | 550 |
| MFI[1] | 4.4 | 3.2 | 4.0 | 2.8 | 0.8 | 0.7 |
| Tg[2] | 107 | 114 | 113 | 113 | 109 | 113 |
| Mn[3] | 107 | 108 | 93 | 96 | 97 | 93 |
| Mw[3] | 222 | 269 | 307 | 354 | 413 | 405 |
| Mz[3] | 335 | 1867 | 3754 | 4963 | 4763 | 4849 |
| Polydispersity[4] | 2.1 | 2.5 | 3.3 | 3.7 | 4.2 | 4.3 |

[1] ASTM D-1238 g/10 min, 200 C./5 kg, October 2001.
[2] ASTM D-3418, C, DSC inflection (Mid) Point, July 1999.
[3] ASTM D-6474
[4] Mz/Mn.
*Not an example of the invention.

TABLE 3

|  | Comp-3* | 3-A Na Salt | 3-B Ca Salt | 3-C Al Salt | 3-D Zr Salt |
|---|---|---|---|---|---|
| Methacrylic Acid, ppm | NA | 1269 | 1269 | 1269 | 1269 |
| Sodium, ppm[1] | NA | 339 | NA | NA | NA |
| Calcium, ppm[2] | NA | NA | 295 | NA | NA |
| Aluminum, ppm[3] | NA | NA | NA | 132 | NA |
| Zirconium, ppm[4] | NA | NA | NA | NA | 336 |
| Melt Flow[5] | 2.90 | 2.89 | 2.70 | 1.80 | 0.51 |
| Tg[6] | 107.5 | 108.0 | 108.6 | 109.3 | 109.7 |
| Mn[7] | 124,563 | 119,328 | 126,800 | 129,454 | 114,417 |
| Mw[7] | 256,581 | 262,625 | 285,875 | 608,260 | 1,044,123 |
| Mz[7] | 391,336 | 400,917 | 613,472 | 6,737,117 | 10,494,556 |
| PDI[8] | 2.1 | 2.2 | 2.3 | 4.7 | 9.1 |

[1] as sodium ethoxide
[2] as calcium carbonate
[3] aluminum(III)isopropoxide
[4] zirconium(IV)butoxide
[5] ASTM D-1238 g/10 min, 200 C./5 kg, October 2001.
[6] ASTM D-3418, C, DSC Inflection (Mid) Point, July 1999.
[7] ASTM D-6474
[8] Mz/Mn.
*Not an example of the invention.

We claim:

1. A process for preparing a branched aromatic ionomer comprising:
   co-polymerizing a first monomer comprising an aromatic moiety and an unsaturated alkyl moiety and 1 pph or less of a second monomer to thereby form a branched aromatic ionomer, wherein said second monomer comprises an ionic moiety and at least two unsaturated moieties, wherein the ionic moiety has at least two ionizable groups, a cationic group that ionizes to form cations and an anionic group that ionizes to form anions, and wherein the cationic group is polyvalent and one capable of forming bridges to other molecules; and
   wherein the second monomer is comprised of a compound having a formula of:

$[R-A^z\frac{}{}_y-M^x$, where:

R is a hydrocarbon chain having from 2 to 7 carbons and at least one polymerizable unsaturation,
   A is an anionic group,
   M is a cationic group,
   Z is −1 or −2,
   X is +1, +2, +3, +4, or +5, and
   y is an integer having a value of from 1 to 4; and
   wherein the second monomer is prepared prior to the co-polymerization by admixing components in-line to a reactor or in-situ in a reactor.

2. The process of claim 1 wherein the second monomer is prepared in-situ in the first monomer.

3. The process of claim 1 wherein the second monomer is prepared from an unsaturated acid or anhydride and a metal alkoxide.

4. The process of claim 1 wherein the second monomer is prepared by reacting an organic acid or an anhydride with a metal or metal salt.

5. The process of claim 4 wherein the second monomer is prepared by admixing zinc alkoxide with methacrylic acid in-situ.

6. The process of claim 4 wherein the metal salt is selected from the group of a sodium salt, a calcium salt, an aluminum salt, and a zirconium salt.

7. The process of claim 5 wherein the zinc alkoxide is zinc butoxide.

8. The process of claim 1 wherein the first monomer is selected from the group consisting of alphamethyl styrene, t-butylstyrene, p-methylstyrene, vinyl toluene, and mixtures thereof.

9. The process of claim 1 wherein the second monomer is selected from the group consisting of: zinc diacrylate, zinc dimethacrylate, zinc di-vinylacetate, zinc di-ethylfumarate; copper diacrylate, copper dimethacrylate, copper di-vinylacetate, copper di-ethylfumarate; aluminum (III) isopropoxide, aluminum triacrylate, aluminum trimethacrylate, aluminum tri-vinylacetate, aluminum tri-ethylfumarate; zirconium tetraacrylate, zirconium tetramethacrylate, zirconium tetra-vinylacetate, zirconium tetra-ethylfumarate, zirconium (IV) butoxide; and mixtures thereof.

10. The process of claim 1 wherein the second monomer is zirconium (IV) butoxide or zinc diacrylate.

11. The process of claim 1 wherein the second monomer is zinc dimethacrylate or zinc diacrylate.

12. The process of claim 1 where the cationic group is selected from the group consisting essentially of: zinc, copper, lead, calcium, magnesium, zirconium, aluminum, and a combination thereof.

13. The process of claim 1 wherein the first and second monomers are admixed prior to or at the time of the co-polymerization.

14. The process of claim 1 wherein the first and second monomers are admixed with a solvent prior to co-polymerization.

15. The process of claim 1 wherein a polymerization initiator is used in an amount of about 1 percent by weight of the monomers.

16. The process of claim 1 further comprising the step of using a polymerization initiator.

17. The process of claim 16 wherein the polymerization initiator is selected from the group consisting of benzoyl peroxide, lauroyl peroxide, t-butyl peroxybenzoate and 1,1-di-t-butylperoxy-2,4-di-t-butylcyclohexane, and combinations thereof.

18. The process of claim 1 wherein a chain transfer agent is used during co-polymerization.

19. The process of claim 1 further comprising the steps of foaming the ionomer and using said foamed ionomer to make an article.

20. The process of claim 1 further comprising the step of making an article with said ionomer.

21. The process of claim 1 wherein the ionomers are admixed with additives prior to being used in end use applications, and wherein the additives are selected from the group consisting of fire retardants, antioxidants, lubricants, blowing agents, UV stabilizers, antistatic agents, and combinations thereof.

22. A process for preparing a branched aromatic ionomer comprising:
   co-polymerizing a first non-ionic monomer comprising an aromatic moiety and an unsaturated alkyl moiety and 1 pph or less of a second monomer to thereby form a branched aromatic ionomer, wherein said second monomer comprises an ionic moiety and at least one unsaturated moiety, wherein the ionic moiety has at least two ionizable groups, a cationic group that ionizes to form cations and an anionic group that ionizes to form anions, and wherein the cationic group is a mono-valent group; and
   wherein the second monomer is comprised of a formula of:

$[R-A^z\frac{}{}_y-M^x$, where:

R is a hydrocarbon chain having from 2 to 7 carbons and at least one polymerizable unsaturation,
   A is an anionic group,
   M is a cationic group,
   Z is −1 or −2,
   X is +1, +2, +3, +4, or +5, and
   y is an integer having a value of from 1 to 4; and
   wherein the second monomer is prepared prior to the co-polymerization by admixing components in-line to a reactor or in-situ in a reactor.

23. The process of claim 22 wherein the second monomer is prepared in-situ in the first monomer.

24. The process of claim 22 wherein the second monomer is prepared from an unsaturated acid or anhydride and a metal alkoxide.

25. The process of claim 22 wherein the second monomer is prepared by reacting an organic acid or an anhydride with a metal or metal salt.

26. The process of claim 22 wherein the first monomer is selected from the group consisting of alphamethyl styrene, t-butylstyene, p-methylstyrene, vinyl toluene, and mixtures thereof.

27. The process of claim 22 wherein the second monomer is selected from the group consisting of sodium acrylate, sodium methacrylate, sodium ethoxide, silver methacrylate, and a combination thereof.

28. The process of claim 22 where the cationic group is selected from the group consisting of: sodium, potassium, cesium, silver, and a combination thereof.

29. The process of claim 22 where the cationic group is a quaternary ammonium forming compound.

30. The process of claim 22 further comprising the step of admixing the first and second monomers prior to or at the time of the co-polymerization.

31. The process of claim 22 wherein the first and second monomers are admixed with a solvent prior to co-polymerization.

32. The process of claim 22 further comprising the step of using a polymerization initiator.

33. The process of claim 32 wherein the polymerization initiator is selected from the group consisting of benzoyl peroxide, lauroyl peroxide, t-butyl peroxybenzoate and 1,1-di-t-butylperoxy-2,4-di-t-butylcyclohexane, and combinations thereof.

34. The process of claim 22 wherein a chain transfer agent is used during co-polymerization.

35. The process of claim 22 further comprising the steps of foaming the ionomer and using said foamed ionomer to make an article.

36. The process of claim 22 further comprising the step of making an article with said ionomer.

37. The process of claim 22 wherein the ionomers are admixed with additives prior to being used in end use applications, and wherein the additives are selected from the group consisting of fire retardants, antioxidants, lubricants, blowing agents, UV stabilizers, antistatic agents, and combinations thereof.

* * * * *